United States Patent [19]

Freudenthal

[11] 4,356,473

[45] Oct. 26, 1982

[54] MONETARY DOCUMENT PROFILE LOCATION AND PREDETERMINED SELECTED PATH APPARATUS

[75] Inventor: William E. Freudenthal, Marlboro, Mass.

[73] Assignee: GTE Laboratories Incorporated, Waltham, Mass.

[21] Appl. No.: 190,006

[22] Filed: Sep. 23, 1980

[51] Int. Cl.³ .................................... G06K 9/04

[52] U.S. Cl. .................................... 340/146.3 H; 235/436

[58] Field of Search ........... 235/436, 440, 449, 925 B; 340/146.3 H; 360/77; 209/534, 569, 583, 584

[56] References Cited

U.S. PATENT DOCUMENTS 3,432,673 3/1969 Mader .......................... 340/146.3 H

*Primary Examiner*—Joseph A. Orsino, Jr.

*Attorney, Agent, or Firm*—Fred Fisher

[57] ABSTRACT

The denomination indicia contiguous with the Treasury seal on United States paper money can be located. Apparatus includes means for transporting the documents lengthwise along a course. Two reproduce heads, each having a like plurality of tracks oriented along a line substantially perpendicular to the direction of motion. Means associated with one head detect the leading edge margin of each document. Means responsive to the detection of the leading edge margin produce a set of timing pulses. A latch means responsive to the tracks of the first magnetic head upon receipt of one of the timing signals indicate the likelihood of a portion of the denomination indicia being in proximity thereto. Shift register means are responsive to the latch means. Clock pulses are applied for shifting the shift register during a time interval when the likelihood of a portion of the denomination indicia is in proximity to the first head. The count of the counting means is incremented by applying a single clocking pulse thereto prior to the interval and by applying additional clocking pulses thereto during the interval. Means are responsive to selective stages of the shift register being in the same state for providing a track select enable signal and for causing the counting means to cause incrementation. Switching means, enabled by the track select enable signal, and responsive to the count of the counting means, select one of the tracks of the second magnetic reproduce head for coupling to an amplifier.

5 Claims, 4 Drawing Figures

MONETARY DOCUMENT PROFILE LOCATION AND PREDETERMINED SELECTED PATH APPARATUS

BACKGROUND OF THE INVENTION

This invention relates to apparatus for ascertaining the profile location of a monetary document and for selecting a predetermined path thereon. In particular, it relates to apparatus for locating the denomination indicia which is contiguous with the Treasury seal on documents of United States paper currency and for selecting a predetermined longitudinal path through such indicia. Accordingly, it is a general object of this invention to provide new and improved apparatus of such character.

In a related copending United States patent application by Joel R. Finkle, William E. Freudenthal and John G. Stoides, entitled "Methods of and Apparatus for Sensing the Denomination of Paper Currency", Ser. No. 067,064, filed Aug. 15, 1979, it is taught that United States paper currency can be denomination sensed by a system for scanning a predetermined path along one surface and comparing the resultant scan against a standard for a particular denomination.

The Federal Reserve System is in the process of acquiring high speed currency handling machines to evaluate and count Federal Reserve Notes (documents) returned from its member banks. A stack containing several thousand documents of only one of the seven denominations is loaded into the high speed currency handling machine. The machine separates and speeds them along a conveyor system one at a time. To assure a correct monetary count, it is necessary to verify that each and every document in the stack is of the same denomination as the nominal denomination.

Verification is based on the magnetic susceptibility of the black iron oxide intaglio ink used to print the obverse face of all Federal Reserve Notes. All of the black graphic pattern is printed with magnetically susceptible iron oxide ink except the Federal Reserve seal and the four Federal Reserve district numbers, which are nonmagnetic in character. The Treasury seal and serial numbers are printed with green ink that is not magnetically susceptible.

Each document travels in one direction between pinch belts over a rotating drum at a predetermined nominal rate of speed. Normally, the documents are oriented with the portrait head up, though several of the documents may be oriented with the portrait head down. When the iron oxide graphic printing is first magnetized, while it moves past a permanent magnet in a transport track of the high speed currency handling machine, each track of a magnetic recording multitrack reproduce head, held in a fixed radial position facing the drum, detects a magnetic pattern between the leading and trailing edge margins of a document.

To verify each denomination, a pattern is recognized that is unique to each of the seven denominations. The seven denominations presently in use are: one dollar, two dollar, five dollar, ten dollar, twenty dollar, fifty dollar and 100 dollar bills. Visual studies have indicated that a pattern exists through the middle of the denomination name, between its longitudinal boundaries located under the Treasury seal, that identifies denomination.

If, when a document passes under the magnetic head, its graphic pattern is always in the same vertical position with respect to the track positions, a preselected track would detect a midline pattern. However, a slowly varying vertical displacement does occur from document to document for any one or more of the following reasons:

1. Documents, in their travel, may "float" up in the vertical direction by as much as 5/16".
2. The entire graphic print, the dimensions of which are constant, may be displaced vertically $\pm\frac{1}{8}$" on the document.
3. A small fraction may be loaded into the high speed currency handling machine with the portrait head down in an opposite orientation.

For the foregoing reasons, a distinguishing feature that appears on all denominations must first be located relative to the head tracks before selecting the track that will detect the midline pattern. The top and bottom margins are ideal, but they are covered by the pinch belts.

One feature, present on all denominations of United States currency, is the term "Washington, D.C.", which is above the denomination name or indicia of the currency. The feature, "Washington, D.C.", together with the top portion of the denomination name can be recognized easily because there is no magnetically susceptible ink above or on either side of it. When a document passes under the multitrack head, magnetic line patterns are detected between the longitudinal boundaries of the name by a consecutive succession of tracks. The topmost, in the succession, detects "Washington, D.C.", and the remainder detects patterns down through the name. This consecutive succession of track patterns is referred to hereinafter as the "profile" of the name.

SUMMARY OF THE INVENTION

Thus, it is another object of this invention to provide a new and improved apparatus for locating the "profile" of a monetary document for both a normal head-up and the occasional head-down orientation and, from such "profile" location, selecting a track that can detect the midline of the denomination indicia.

In accordance with one embodiment of the invention, apparatus for locating the denomination indicia contiguous with the Treasury seal on documents of the United States paper currency, and for selecting a predetermined longitudinal path through such indicia, can include means for transporting the documents, lengthwise, along a course. Means, associated with the course, magnetize iron oxide ink printing on the documents that are transported therealong. A first magnetic reproduce head, associated with the course, has a plurality of tracks oriented along a line substantially perpendicular to the direction of motion of each document that is transported thereagainst. A second magnetic reproduce head, associated with the course, has a like plurality of tracks oriented along a line substantially perpendicular to the direction of motion of each document transported thereagainst. The tracks of the second head are aligned with the tracks of the first head in the course direction. Means are associated with the first head for detecting a leading edge of the margin of each document transported thereagainst. Means are responsive to the detection of the leading edge margin for producing a set of timing signals. A like plurality of latch means are responsive to the tracks of the first magnetic head upon receipt of one of the timing signals indicative of a likelihood of a portion of a denomination indicia being in proximity to the first head. Shift register means, having a like plurality of stages, are responsive to the latch means when the likelihood of a portion of the denomination indicia is initially in proximity to the first head. A series of clocking pulses are applied to shift the shift register means at a time interval when the likelihood of a portion of the denomination indicia is in proximity to the first head. Counting means provide a count at an output thereof. The counting means are cleared prior to detection of the leading edge margin. Its count is incremented by effectively applying a single clocking pulse thereto prior to the interval and by applying additional clocking pulses thereto during the interval. Means are responsive to selected stages of the shift register being in the same state for providing a "track select enable" signal and for causing the counting means to cease incrementation, though some or all of the additional checking pulses have yet to be applied to the counting means during the interval. Switching means are enabled by the "track select enable" signal, and are responsive to the count of the counting means for selecting one of the tracks of the second magnetic reproduce head for coupling to an amplifier. The amplifier provides a signal indicative of the predetermined longitudinal path through the indicia.

In accordance for certain features of the invention, the likelihood of a portion of the denomination indicia being in proximity to the first head occurs during a time somewhat subsequent to the leading edge margin being detected, but is prior to the first head coming into proximity with the portrait. With other features, the likelihood of the denomination indicia being in proximity to the first head occurs during the following periods of time:

(a) Somewhat subsequent to the leading edge margin being detected, but prior to the first head coming into proximity with the portrait, and (b) subsequent to the first head coming into proximity with the portrait, but somewhat prior to the first head coming into proximity with a trailing edge margin.

With certain features of the invention, the switching means, in selecting one of the tracks of the second magnetic head, is responsive to the sum of the count of the counting means plus a constant. The constant during the time interval (a) is of a different value than that during the period of time (b) with still other features of the invention, the means responsive to the detection of the leading edge margin for producing a set of timing signals includes a counter (which is adapted to commence count upon detection of the leading edge margin) which generates a number of counting signals, and is reset upon generation of a terminal counting signal. A timer generates specific timing signals at outputs thereof as the counter sequences the number of counting signals.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF A PREFERRED EMBODIMENT

Figure 1:
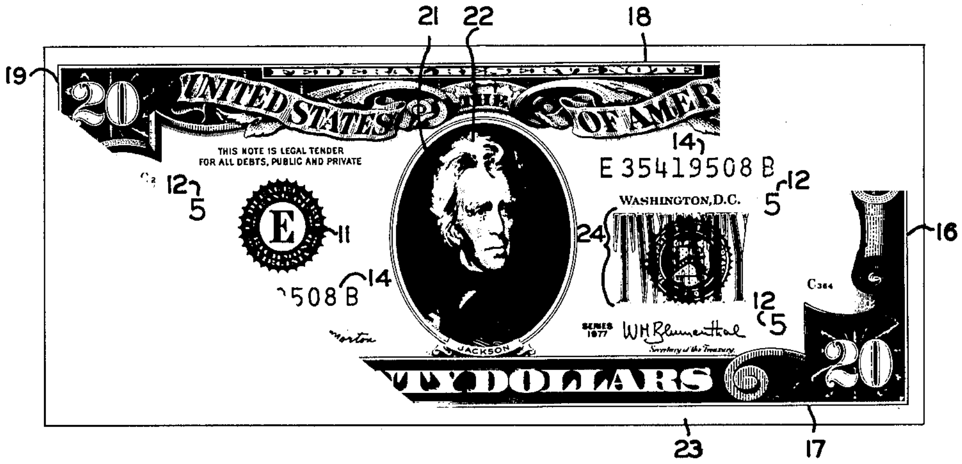
FIG. 1 is an obverse view of a portion of United States currency showing various features thereof.

Referring to FIG. 1, there is shown a portion of the obverse face of a $20 Federal Reserve Note. All of the black graphic pattern of such a Note is printed with magnetically susceptible iron oxide ink, except the Federal Reserve Seal 11 and the four (three of which are shown) Federal Reserve district numbers 12—12 which are nonmagnetic in character. The Treasury seal 13 and serial numbers 14—14 are printed with green ink that is not magnetically susceptible. The document, as shown in FIG. 1, normally travels from left toward right. Hence, the first line at the right-hand side of the document is termed a "leading edge" margin 16. The leading edge margin 16 abuts a bottom margin line 17 and a top margin line 18. At the left-hand side of the note, the bottom margin line 17 and top margin line 18 join with a trailing edge margin line 19. The obverse side of a document always contains a portrait 21 in which the head 22 thereof, may either be in a head-up or head-down orientation. The bottom portion of the document below the bottom margin line is termed a "gutter" 23. The designation, "Washington, D.C.", and the denomination name such as TWENTY appearing below the "Washington, D.C." indicia is termed a "profile" 24.

Figure 2:
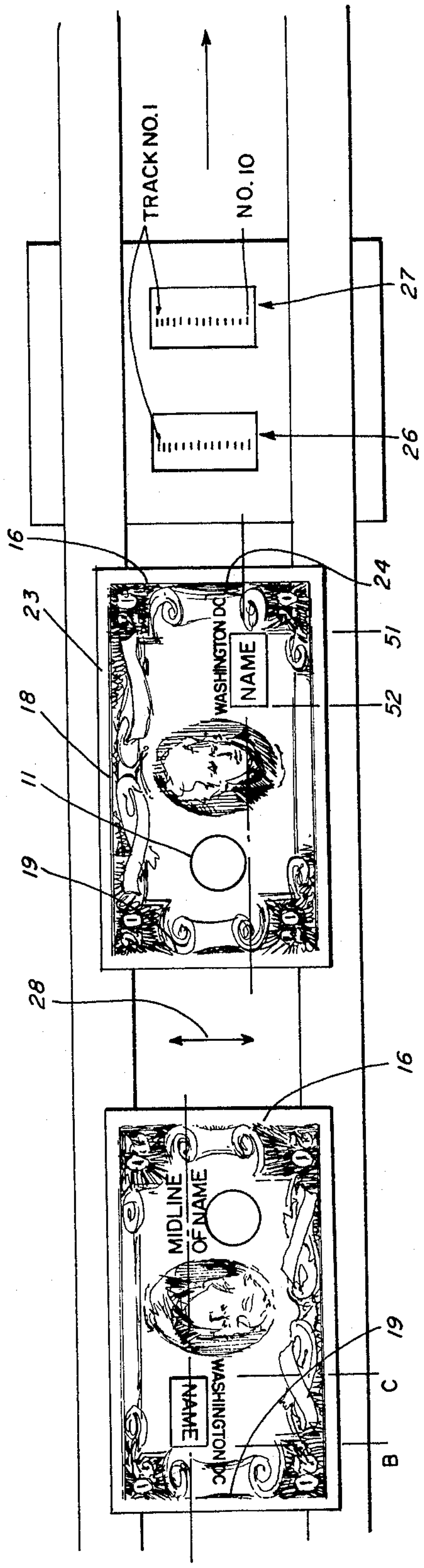
FIG. 2 illustrates a pair of multitrack magnetic reproduce heads in conjunction with a pair of documents being transported along a particular course in accordance with the invention.

Referring to FIG. 2, there is depicted two identical multitrack magnetic reproduce heads 26, 27. In one embodiment described herein, ten tracks, spaced 0.1 in. apart, are used on each head 26, 27. The corresponding tracks of one head 26 are aligned exactly with those of the other head 27 in the horizontal direction. The tracks can be numbered from 1 to 10 with number 1 at the highest (vertical) location. The first head 26 is used to locate circuitry, described hereinafter, determines which of the 10 tracks are aligned over the profile and consequently which track is over the midline of the name. The logic, as discussed hereinafter, then selects the correct track of the second head 27 that senses the pattern through the midline of the name.

As stated above, the documents may vary in their vertical displacement for several reasons and such displacement is indicated in FIG. 2 by the double arrowed line 28.

Figure 3:
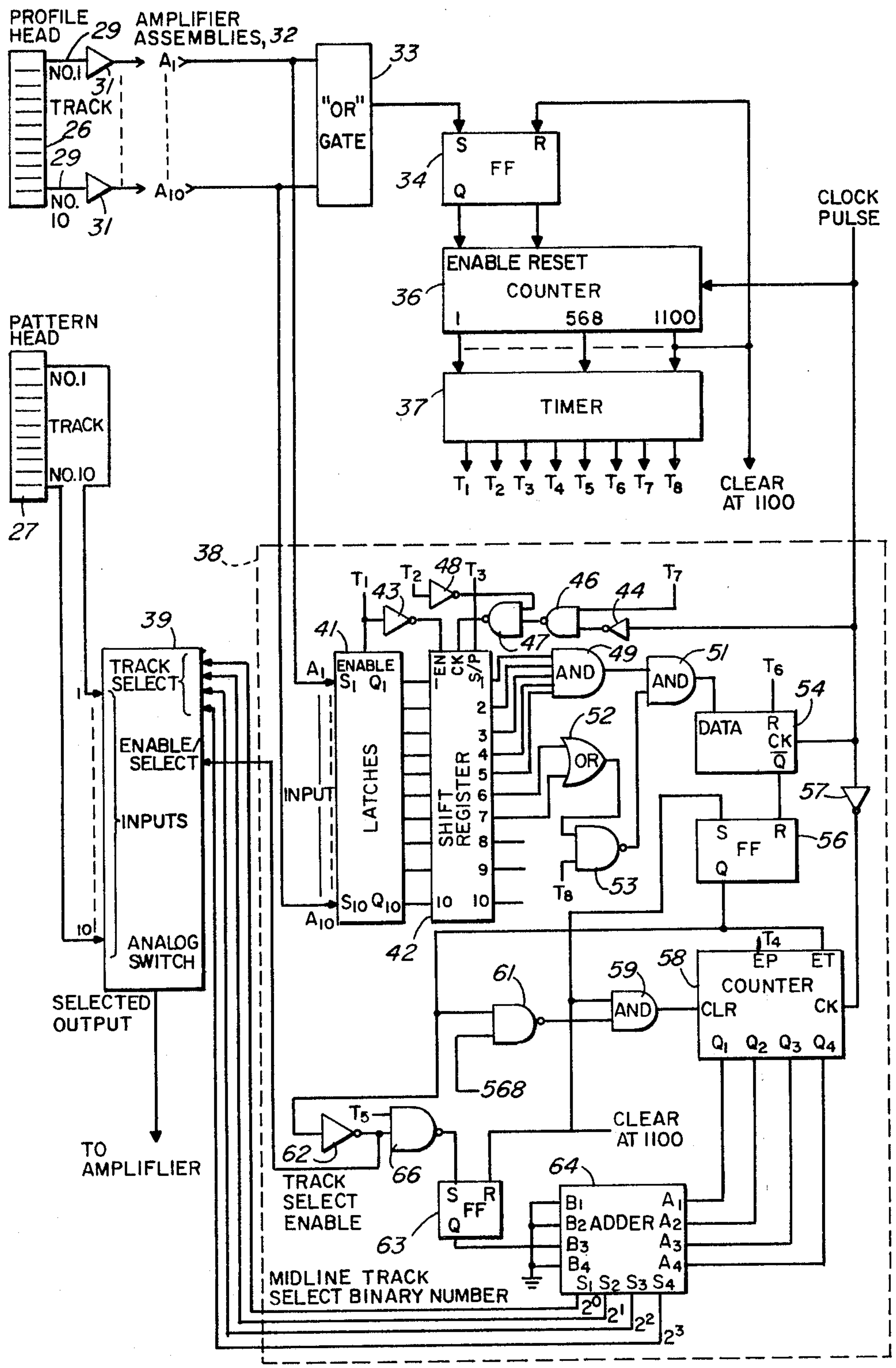
FIG. 3 is a block diagram of a particular embodiment of the invention.

Referring to FIG. 3 the read windings of the various tracks of the profile head 26 are coupled along lines 29—29 through amplifiers 31—31 and amplifier assemblies 32 to an OR circuit 33, the output of which is coupled to set a flip flop 34. The Q output of the flip flop 34 is coupled to enable a counter 36 which receives clocking pulses thereto from a high speed currency handling machine. The counter counts from 1 through 1100 and resets itself back to 1 again. The outputs of the counter 36 are coupled to a timer 37 which provides a series of timing pulses T1, T2, T3, T4, T5, T6, T7, T8. The timer 37 has its timing pulses coupled to a logic circuit 38. An 1100 pulse from the counter 36 resets the flip flop 34 and also provides a "clear" signal to various components of the logic circuit 38.

The pattern head 27 has the read windings of its various tracks coupled as inputs to an analog switch 39.

Signals from the profile head 26 are coupled through the logic circuit 38 as a plurality of inputs to latches 41 (which operate as flip flops, as will become more apparent hereinafter). Outputs from the latches 41 are coupled to a shift register 42. A timing pulse T1 is applied to enable the latches 41 and is also applied via an inverter 43 to enable a shift register 42. Serial/parallel orientation of the shift register 42 is controlled by a timing pulse T3. Clock pulses are applied through an inverter 44 to a NAND gate 46 having a second input coupled to receive the timing pulse T7. The output of the NAND gate 46 is coupled through a NAND gate 47 to the clock input terminal of the shift register 42. A second input of the NAND gate 47 is coupled to receive the output of an inverter 48 to which the timing pulse T2 is applied as its input.

The five most significant stages of the shift register 42 are coupled as inputs to an AND 49. The output of the AND gate 49 is coupled to one input of an AND gate 51. The sixth and seventh most significant stages of the shift register 42 are coupled through an OR circuit 52 whose output is coupled as an input to a NAND gate 53. A second input of the NAND gate 53 is coupled to receive a T8 timing pulse. The output of the NAND gate 53 is coupled as a second input to the AND gate 51. The output of the AND gate 51 is coupled to a data terminal of a data flop 54. The data flop 54 is reset by a timing pulse T6 and receives clocking pulses from the high speed currency handling machine. The Q output of the data flop 54 is coupled to reset a flip flop 56 which has been previously set by a "clear at 1100" pulse from the counter 36. Clock pulses from the high speed currency handling machine are coupled through an inverter 57 to the clock terminal of a counter 58. The counter 58 is enabled by a timing pulse T4 applied to its EP terminal. The counter 58 is cleared upon receiving a signal from the output of an AND gate 59 whose inputs are a "clear at 1100" signal and the output from a NAND gate 61. The inputs to the NAND gate 61 are a 568 pulse signal, and the Q output from the flip flop 56. The Q output from the flip flop 56 is coupled through an inverter 62 to provide a "track select enable" signal to the enable/select terminal of the analog switch 39. The "clear at 1100" signal is also applied to set the flip flop 56 and to reset a flip flop 63 whose Q output terminal is coupled to the B3 input terminal of an adder 64.

The output of the inverter 62 is coupled to one input of a NAND gate 66 whose second input is coupled to receive the T5 timing signal. The output of the NAND gate 66 is coupled to set the flip flop 63.

The B1, B2 and B4 terminals of the adder 64 are coupled to a point of reference potential. Hence, the inputs B1, B2, B3 and B4 are either all at equal potential designating a binary signal of zero, or the B1, B2, B3, B4 signals carry a signal of 0010 which designates a binary four applied to the adder 64.

The output from the flip flop 56 is coupled to the ET terminal of the counter 58. When its polarity is positive, the counter 58 counts clock pulses applied from the inverter 57. Upon termination of the output signal from the flip flop 56, the counter 58 stops counting, and the signals on the counter output terminals Q1, Q2, Q3, Q4 remain in steady state condition.

The Q1, Q2, Q3, Q4 outputs from the counter 58 are applied to the A1, A2, A3, A4 input terminals of the adder 64. The adder 64 provides signals at its outputs S1, S2, S3, S4 which total the signals applied to its inputs A1, A2, A3, A4 and B1, B2, B3, B4. The output signals from the adder 64 are applied to "track select" input terminals of the analog switch 39 which, in turn, selects which of the various read track windings from the pattern head 27 should be coupled to an amplifier, not shown.

In operation, each track winding of the profile head 26 senses an alterating magnetic pattern and converts it into an electronic signal on the lines 29—29. These signals are amplified, by the amplifiers 31—31, and rectified and digitized in the appropriate assembly 32 for compatibility with CMOS logic. Each of the ten signals is applied to the "OR" circuit 33 which switches when any track detects the leading edge margin 16 of a document. The "OR" circuit 33 provides maximum assurance that the leading edge margin 16 is detected when a document is torn. When the "OR" circuit 33 switches, a timing sequence commences that is critical for both a profile location and a pattern track selection timing. When the "OR" circuit 33 switches, it sets the flip flop 34 which enables the counter 36 to commence counting. The counter 36 increments one count with each high speed currency handling machine clock cycle. As the clock pulses are applied to the counter 36 at a constant frequency, and as the documents are transported along the high speed currency handling machine at a constant speed, the clock frequency is directly proportional to the distance that a document travels. Consequently, the quantity stored in the counter 36 indicates the longitudinal position of the document aligned under the profile head 26. When the counter 36 reaches the quantity 1100, the trailing edge 19 of the document has passed the pattern head 27. At this time, the flip flop 34 is reset, which, in turn, resets the counter 36 to the quantity zero until the next document arrives at the profile head 26.

The timing signals for the logic 38, shown generally within a dashed border, are derived from the counter 36 quantity, and are provided by the timer 37 which is coupled to the output of the counter 36.

The logic 38 receives the ten digitized profile track signals from the amplifier assembly 32 and, in accordance with the timing signals from the timer 37, determines the profile location. From that, the pattern track head 27, aligned over the midline of the denomination indicia, is selected by the analog switch 39 (which, in one embodiment, can be a Siliconix DG506) by way of a 4-bit binary signal and an enable signal.

It is understood, however, that other numbers of tracks can be used, i.e., twenty, where better accuracy is desired. When twenty tracks are used in lieu of ten, a five-bit binary signal is used in lieu of a four-bit binary signal.

Figure 4:
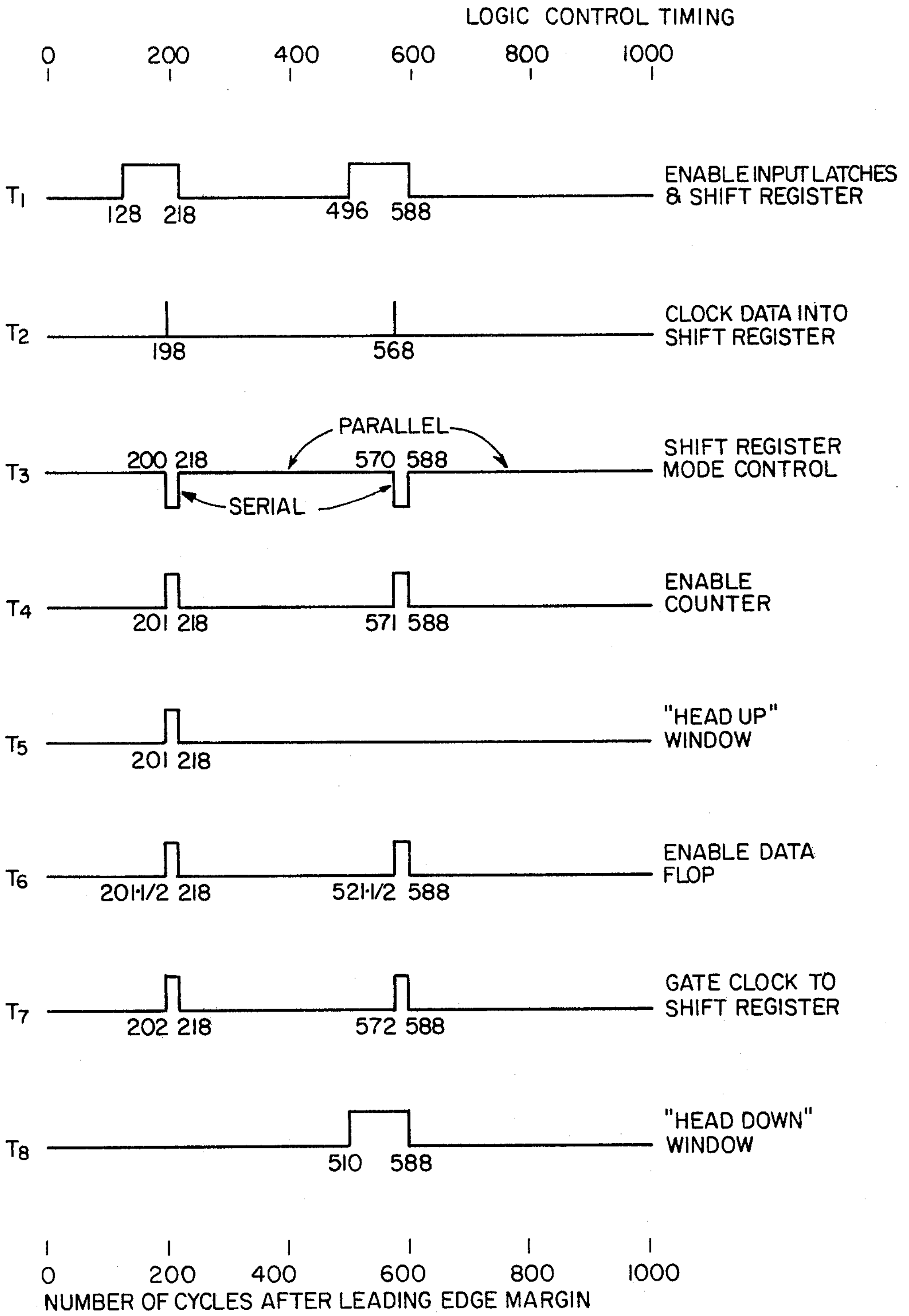
FIG. 4 is a set of waveforms helpful for understanding the operation of the embodiment depicted in FIG. 3.

All of the circuitry depicted within the logic 38 can be CMOS logic. The latches 41 can be quad latches, such as Motorola 14044. The shift register 42 can be comprised of three cascaded 4-bit parallel/serial shift registers, such as Motorola 14035. The counter 58 can be a Motorola type MM74C161. The data flop 54 can be a Motorola type MM74C74 while the adder 64 can be Motorola type 140008. Other devices depicted within the logic 38 are shown with standard logic symbols. The signals T1 through T8 are timing signals, as depicted in FIG. 4. The numbers under the timing signals in FIG. 4 are counter quantities which represent the position with respect to the profile head 26.

The digitized profile track signals from the profile head 26 are stored in the latches 41. Then, they are loaded into the shift register 42. Next, they are shifted serially with each high speed currency handling machine clock cycle toward its first output. The counter 58, initially at zero, is incremented with the clock pulse, but begins one cycle before the shift register 42 begins shifting, as will become more apparent hereinafter. The shift register 42 continues to shift until logic "1"s appear at the inputs of the "AND" gate 49 causing it to switch. When the "AND" gate 49 switches, it presents a logic "1" to the data input of the data flop 54 through the "AND" gate 51. With a "1" at the data input of the data flop 54, the next clock pulse applied to the data flop 54 causes its output to switch to a logic "0". That, in turn, switches and latches the output of the flip flop 56 to a logic "0" until the 1100 signal. When that occurs, the following conditions prevail until the trailing edge 19 of the document has passed the pattern head 27:

(1) The output of the counter 58 remains in a fixed logic state.
(2) An enable signal is presented to the analog switch 39.
(3) The output level of the flip flop 63 is switched to a logic 1.

Consequently, the output of the adder 64 which sums the levels on its two sets of inputs, remains in a fixed logic state. Its quantity determines which track on the pattern head 27 is selected by the analog switch 39. In this manner, the pattern head track is selected.

The output quantity of the counter 58 indicates which track was aligned over the name, "Washington, D.C." The output quantity of the counter 58 is equal to the number of high speed currency handling machine clock pulses that are required to shift the shift register 42 so that the five logic ones are presented at the input of the "AND" gate 43 plus one. For example, where track #6 to be aligned over "Washington, D.C.", the shift register outputs 6 through 10 would be at the logic level. Five shifts would be required before the "AND" gate 49 switches to disable the counter 58. When the counter 58 is disabled, its output becomes six (0110 in binary code), that is, five shifts plus one.

The average height of the name, including "Washington, D.C.", is 0.77 inch. The heat track spacing in one embodiment is 0.1 inch. Therefore, the midline of the name is four tracks below "Washington, D.C.", which, in this example, is track #10. To select track #10 of the pattern head 27 by the analog switch 39, quantity four (binary 0100) is applied to the "B" input of the adder 64. This occurs when the flip flop 63 switches after the output level of the flip flop 56 is switched to a logic "0".

When a document is upside down, that is, in a head-down orientation, the same sequence described for normal orientation occurs with the following exceptions:

1. The flip flop 63 does not switch; its output remains at a logic zero.
2. The logic pattern on the shift register 42 output is reversed.

This time, with the head-down orientation, to latch the output of the flip flop 56 to logic "0" and, consequently, select a pattern head track, in addition to the logic "1"s being applied to the "AND" gate 49, logic "0" s are applied to the "OR" circuit 52. The logic "0"s to the "OR" circuit 52 represent the area above "Washington, D.C." (the term "above" refers to normal orientation) that is devoid of magnetically susceptable ink. Because type 14035 shift registers shift in one direction only and to simplify the logic, it is desirable to sense this blank area for reverse orientation. For example, were the term "Washington, D.C." to be detected by track #8, the following logic pattern would appear at the shift register output: logic "1"s at tracks 4 through 8, and "0"s at tracks 9 and 10. The flip flop 56 output level switches to logic "0" (pattern track becomes selected) after three shifts of the shift register 42. The output of the counter 58 becomes four (0100 binary). The midline of the name becomes aligned with track #4 which is equal to the counter 58 output quantity. Therefore, the "B" input to the adder 46 should be zero bcause the flip flop 63 is disabled from switching by the timing signal T5.

The timing signal T1 (FIG. 4) is coupled to enable the latches 41 and the shift register 42 during two different time intervals. The T1 signal has a positive enabling signal during the period from cycles 128 through 218 and from cycles 496 through 588. The period of time from cycles 128 to 218 applies to a document that is oriented in a normal position. The period of time for the cycles 496 to 588 represents a head-down orientation. The cycle 128 occurs when a position on a document one inch to the left of the leading edge margin is under the profile head 26. That is, at the position 51-FIG. 2. The cycle 218 occurs about three-quarters of the distance through the name, that is, between the position 51 at the beginning of the name and the position 52 at the end of the name. Correspondingly, for head-down orientation, the cycle 496 occurs when position C is under the profile head 26. With such orientation, the beginning of the name occurs at position B (see FIG. 2).

The timing signal T1, as stated above, enables the latches 41 and the shift register 42. The timing signal T2, which occurs during the cycle 198 and the cycle 568, operates to clock data from the latches 41 into the shift register 42.

The T3 signal operates as the shift register 42 mode control to cause it to switch from parallel to serial operation for shifting to take place. The T3 signal instructs the shift register 42 to operate in a serial mode during the cycles 200 through 218 and during the cycles 570 through 588. At other time periods, the shift register 42 operates in the parallel condition.

The timing pulse T4, coupled to the EP input terminal of the counter 58 during the time periods 201 through 218 and from 571 through 588, enables the counter 58.

The timing pulse T5, coupled through the NAND gate 66 sets the flip flop 63 when a profile is detected with a normally oriented document; that is, during the T5 time period from the time interval 201 through 218 (in effect, a "head-up" window). The latches 41 are set and such information is switched into the shift register 42, through the AND gate 49, the AND gate 51, set the data flop 54 and to reset the flip 56, whereby, the "track select enable" signal is applied to the NAND gate 66, providing a low output therefrom to set the flip flop 63.

The timing pulse T6, present during the time intervals from cycle 201½ to 218 and from cycle 571½ to 588, enables the data flop 54.

The timing pulse T7, present during cycles 202 to 218 and 572 to 588, gates the clock pulses to the shift register 42. Thus, the counter 58 can start counting the clock pulses from the high speed currency handling machine before the shift register 42 so that they clock in a phased condition. The data flop 54 is clocked out of phase with the counter 58 and the shift register 42. That is, the counter 58, the data flop 54, and the shift register 42 are clocked in sequence. The entire timing sequence from T1 through T7, except the timing pulse T5, repeats, starting at the time period 496, to sense the profile if the document is oriented in a head-down condition.

The timing pulse T8 passes the OR circuit 52 signal to the AND gate 51. If the profile is not sensed before the time 568, the counter 58 is reset to zero at that time.

In summary, signals from the profile head 26 pass through the OR circuit 33 which determines when signals are present at any one of the ten inputs thereto to indicate that the leading edge margin of a document has been detected. Because a document may be torn, whereby one or more input signals may be missing, assurance is obtained by utilizing ten input signals that detection has been made. The OR circuit 33 sets the flip flop 34. The output of the flip flop 34 enables the counter 36 which has previously been reset at the end of an 1100 count. The counter 36 generates at 1100 signals in clocked sequence. The counter 36 outputs are applied to the timer 38 which generates pulses in accordance with that shown in FIG. 4.

The profile head 26 outputs set the latches 41 which are, basically, flip flops or bistable multivibrators. The latches 41 are reset by the timing signal T1 which occurs twice during each document time, as shown on FIG. 4. The output of the latches 41 are coupled to the shift register 42.

The leading edge margin of a document does not set the latches 41 because the latches have been reset by a low level T1 signal. The latches 41 are not enabled until a positive T1 signal is present, which occurs during the time intervals 128 through 218 and 496 through 588. As to the clock input to the shift register 42, the T7 signal is low except during the time period 202 through 218 and the T2 signal is low except during the time period 198. Hence, clock signals pass through the inverter 44, through the NAND gate 46 to which the timing pulse T7 is applied, and through the NAND gate 47 to which the inverted output of the timing pulse T2 is applied. The output of the timing pulse T2 is inverted by the inverter 48. When the timing pulse T7 is low, which occurs before the time period 202, the output of the NAND gate 46 is high. Prior to the time 198 and after 198 and 202, the output of the inverter 48 is also high, so that the output of the NAND gate 47 becomes low and stays low until time 202. At the time 202, the timing pulse T7 becomes high whereby the NAND gate 46 yields clock signals which pass through the NAND gate 47, continuing until time 218. After the time 218, the timing pulse T7 becomes low and the sequence of operation which occurred prior to 202 or prior to 198 continues. Hence, the output of the NAND gate 47 generates clock signals during the period of time 202 to 218. Since the timing pulse T1, which enables the latches 41, is present during the time period 128 through 218, spanning approximately two-thirds of the number designation when any track or tracks of the magnetic head 26 sense magnetic ink during the timing period 128 through 198, its (their) corresponding latch (latches) of the latch circuit 41 becomes set to a logic "1". Those latches corresponding to tracks that did not sense magnetic ink during this time interval remains at logic "0". At time 198, the T2 timing pulse loads this data, representing the "profile", into the shift register 42. The clock pulses pass through the inverter 44 and the NAND gates 46 and 47 only during the T7 times. The shift register 42 shifts serially due to the timing pulse T3 which occurred at the time 200; the timing pulse T7 causes shift to occur at the time period 202 in a serial condition. Shifting occurs until the AND gate 49 has all 1's applied to its inputs.

The AND gate 49 is coupled to the AND gate 51, which receives the output of the NAND gate 53 which, in turn, is coupled to the output of the OR circuit 52.

During a head-up condition, the timing pulse T8 is low; the NAND gate 53 output becomes high. That high NAND gate 53 is coupled to the AND gate 51 so that it passes through whatever is on the output of the AND gate 49.

When the timing pulse T8 is high (e.g., during a head-down condition), the output of the NAND gate 53 depends upon the output of the OR circuit 52 output is low. The NAND gate 53 (to which the time pulse T8 is applied) yields an inverted signal depending upon the output of the OR circuit 52. When the OR circuit 52 output is high, the output of the NAND gate 53 is low and vice versa. With five high signals (logic "1") applied to the AND gate 49 and two low signals (logic "0") applied to the OR circuit 52, the AND gate 51 sets the data flop 54. The data flop 54 is basically a flip flop except that data is put into a data terminal rather than a one to a set terminal. When the data terminal is "set", the data flop 54 provides an output at its $\overline{Q}$ terminal when clocked; that $\overline{Q}$ terminal is zero when a one is set into the data terminal.

The AND gate 49 output that sets the data flop 54 indicates that the profile head 26 has reached the denomination indicia. The flip flop 56 is reset whereby enabling levels are no longer applied to the ET terminal of the counter 58. Hence, the counter 58 is frozen to its state and its outputs Q1, Q2, Q3, Q4 stay in that condition. Such outputs are applied as A1, A2, A3, A4 inputs of the adder 64. The B1, B2, and B4 input terminals of the adder 64 are coupled to a point of reference potential such as ground and the B3 terminal of the adder 64 effectively applies a binary four signal thereto that indicates a number four should be added due to the displacement of the denomination indicia from the center of the document. This is achieved by applying a signal from the flip flop 63 which has been set by flip flop 56, thus adding a four.

At the end of the document, in a head-up condition, an 1100 signal resets the flip flops 56 and 63, and clears the counter 58.

Assume, when a document is upside down, that either the number 6 or the number 7 track of the shift register 42 detects the "Washington, D.C." logo upside down and that the remaining tracks 1 through 5 detect the denomination indicia upside down. The operation is similar as hereinabove, except that a 4 is added to the adder 4 when the head is up and a 0 is added when the head is down. The 568 signal clears the counter prior to reading the second half of the document. This invention is primarily concerned with selecting the track. Once the track is selected, than by means not set forth herein but, for example, set forth in the copending operation by Joel R. Finkel et al, Ser. No. 067,064, filed 8/15/79, the denomination can be detected. This invention is not concerned with the detecting the denomination, per se, but to instruct the system which track of a head should be actuated for a reading to determine the denomination of the document in accordance with the previously known codes. Hence, it is desired in this invention to select a path, such as a center line of the denomination indicia itself.

Various modifications can be performed to this invention without departing from its spirit and scope. For example, a more complicated version utilizing twenty tracks to a head in lieu of ten tracks and multiple gates in lieu of a single gate can be used it is desired to obtain finer accuracy (tracks can be spaced 50 mils apart instead of 100 mils apart). Even finer accuracy can be achieved by using 40 or 80 tracks. However, that it is anticipated that as accuracy is increased, the cost of such a system increases.

The binary signal on the "enable select" line, in conjunction with the "track select", selects one of the ten input lines from the pattern head 27, as chosen, and couples that one of the ten lines to the selected output line.

The OR circuit 33 detects when the leading edge margin is detected, and the timer 38 generates timing signals at the appropriate time when the denomination indicia is to be detected by the tracks of the head. When the denomination indicia is present, four is added to the adder 64 and to that is added any assessment time that is required for the shift register 42 to shift. The adder 64 output can be a 5, 6 or 7 and that output indicates the proper middle track to be read. When the document is in a headdown position, a zero (in lieu of 4) is added to the adder 64.

I claim:

1. Apparatus for locating the denomination indicia contiguous with the Treasury seal on documents of United States paper currency each having a portrait thereon and a margin thereabout and said indicia being imprinted with magnetically susceptible iron oxide ink and said seal being printed with ink that is not magnetically susceptible, and for selecting a predetermined longitudinal path through said indicia comprising means for transporting said documents, lengthwise, along a course;

means associated with said course for magnetizing the iron oxide ink printing of documents transported therealong;

a first magnetic reproduce head, associated with said course, having a plurality of tracks oriented along a line substantially perpendicular to the direction of motion of each document transported thereagainst;

a second magnetic reproduce head, associated with said course, having a like plurality of tracks oriented along a line substantially perpendicular to the direction of motion of each document transported thereagainst, said tracks of said second head being aligned with said tracks of said first head in the course direction;

means associated with said first head for detecting a leading edge of said margin of each document transported against said first head;

means responsive to detection of said leading edge margin for producing a set of timing signals;

a like plurality of latch means responsive to said tracks of said first magnetic head upon receipt of one of said timing signals indicative of a likelihood of a portion of said denomination indicia being in proximity to said first head;

shift register means having a like plurality of stages responsive to said latch means when said likelihood of a portion of said denomination indicia is initially in proximity to said first head;

means for applying a series of clocking pulses for shifting said shift register means at a time interval when said likelihood of a portion of said denomination indicia is in proximity to said first head;

counting means for providing a count at an output thereof;

means for clearing said counting means prior to detection of said leading edge margin;

means for incrementing the count of said counting means by effectively applying a single clocking pulse thereto prior to said interval and for applying additional clocking pulses thereto during said interval;

means responsive to the outputs of a plurality of selected stages of said shift register means being in the same state for providing a track select enable signal and for causing said counting means to cease incrementation, though some or all of said additional clocking pulses have yet to be applied to said counting means during said interval;

an amplifier; and switching means, enabled by said track select enable signal, and responsive to said count of said counting means for selecting one of said tracks of said second magnetic reproduce head for coupling to said amplifier, whereby, said amplifier becomes adapted to provide a signal indicative of said predetermined longitudinal path through said indicia.

2. Apparatus as recited in claim 1 wherein said likelihood of a portion of said denomination indicia being in proximity to said first head occurs during a period of time somewhat subsequent to said leading edge margin being detected but prior to said first head coming into proximity with said portrait.

3. Apparatus as recited in claim 1 wherein said likelihood of a portion of said denomination indicia being in proximity to said first head occurs during the following periods of time:

(a) somewhat subsequent to said leading edge margin being detected but prior to said first head coming into proximity with said portrait, and (b) subsequent to said first head coming into proximity with said portrait but somewhat prior to said first head coming into proximity with a trailing edge margin.

4. Apparatus as recited in claim 3 wherein said switching means in selecting one of said tracks of said second magnetic reproduce head is responsive to the sum of said count of said counting means plus a constant, said constant during period of time (a) being of a different value than that during period of time (b).

5. Apparatus as recited in claim 1 wherein said means responsive to detection of said leading edge margin for providing a set of timing signals comprises a counter adapted to commence count upon detection of said leading edge margin, having a number of counting signals, and adapted to be reset upon generation of a terminal counting signal; and a timer adapted to generate specific timing signals upon outputs thereof as said counter is sequencing said number of counting signals.

* * * * *